US011937151B2

(12) United States Patent
Muralimanohar et al.

(10) Patent No.: US 11,937,151 B2
(45) Date of Patent: Mar. 19, 2024

(54) CENTRALIZED MOBILE NETWORK ACCOUNT MANAGEMENT FUNCTION FOR SHARED MOBILE NETWORK CONSUMPTION TRACKING OF CONVERGED CHARGING SYSTEMS

(71) Applicant: Verizon Patent and Licensing Inc., Basking Ridge, NJ (US)

(72) Inventors: Madhan Muralimanohar, Tampa, FL (US); Violeta Cakulev, Millburn, NJ (US); Muthukumar Retnasamy, Tampa, FL (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 17/536,389

(22) Filed: Nov. 29, 2021

(65) Prior Publication Data

US 2023/0171569 A1 Jun. 1, 2023

(51) Int. Cl.
*H04W 4/00* (2018.01)
*H04M 15/00* (2006.01)
*H04W 4/24* (2018.01)

(52) U.S. Cl.
CPC ............ *H04W 4/24* (2013.01); *H04M 15/59* (2013.01)

(58) Field of Classification Search
CPC ............................... H04W 4/24; H04M 15/59
See application file for complete search history.

(56) References Cited

U.S. PATENT DOCUMENTS

| 2007/0036312 | A1* | 2/2007 | Cai | H04M 15/41 |
| | | | | 379/114.01 |
| 2013/0325696 | A1* | 12/2013 | Graves | G06Q 30/00 |
| | | | | 705/39 |
| 2016/0127210 | A1* | 5/2016 | Noureddin | H04M 15/61 |
| | | | | 455/405 |
| 2016/0212064 | A1* | 7/2016 | Biswas | H04L 67/10 |
| 2020/0045519 | A1* | 2/2020 | Raleigh | H04M 15/765 |
| 2021/0400576 | A1* | 12/2021 | Lee | H04W 48/18 |

* cited by examiner

Primary Examiner — Pakee Fang

(57) ABSTRACT

A network device executes an account management function that pre-authorizes network service unit consumption by multiple subscribers that are members of a same, shared network service account. The account management function receives, from multiple charging systems distributed within the network, network unit consumption charges associated with each of the multiple subscribers, where the network device is centrally located within a network relative to multiple locations associated with the plurality of charging systems. The account management function updates a consumption counter for the same, shared network service account based on the network unit consumption charges associated with the multiple subscribers received from the multiple charging systems distributed within the network.

21 Claims, 12 Drawing Sheets

CENTRALIZED MOBILE NETWORK ACCOUNT MANAGEMENT FUNCTION FOR SHARED MOBILE NETWORK CONSUMPTION TRACKING OF CONVERGED CHARGING SYSTEMS

BACKGROUND

Subscriber devices, such as, for example, cellular telephones, utilize units (e.g., session minutes or amounts of session data) during usage of network services offered by a Network Service Provider (NSP), such as a cellular NSP. NSPs may permit certain subscribers to pre-pay for service units, such as, for example, pre-pay for a certain number of minutes (e.g., 200 minutes) or for a certain amount of data transfer (e.g., 5 Gigabytes (GB)). After the subscriber uses the pre-paid quota, the subscriber must pre-pay for additional service units to continue using the NSP's network services. NSP's may also permit certain subscribers to post-pay for the network service. In such cases, the subscriber may pay a flat fee for usage of service units up to a maximum amount, and then pay additional fees at a later time for usage of service units (i.e., per additional service units) beyond the maximum amount for their selected payment plan.

DETAILED DESCRIPTION OF EXAMPLE EMBODIMENTS

Figure 1:
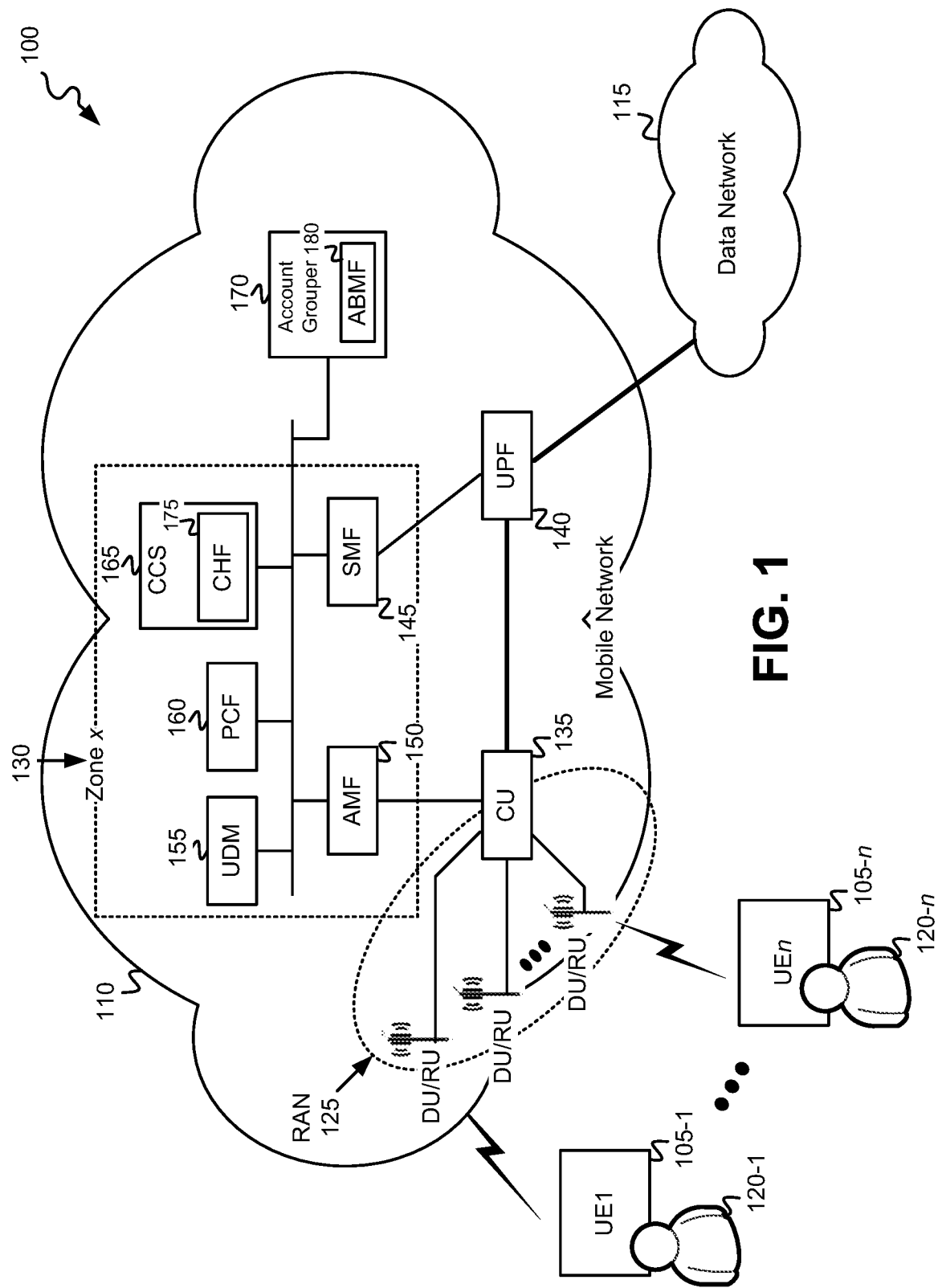
FIG. 1 depicts an example of a network environment in which network service unit consumption may be tracked and aggregated among multiple subscribers that are members of a single account.

The following detailed description refers to the accompanying drawings. The same reference numbers in different drawings may identify the same or similar elements. The following detailed description does not limit the invention.

NSPs often offer "shared consumption" plans in which multiple subscriber devices share network service units, among a common pool of network service units, for a single network service account. For example, the common pool for a shared consumption plan may be a certain maximum number of minutes (e.g., 200 minutes) or a certain maximum amount of data transfer (e.g., 5 Gigabytes (5 GB)) that is shared among multiple subscribers/subscriber devices that are members of a same account. In such "shared consumption" plans, service unit consumption is tracked and aggregated among the multiple subscribers/subscriber devices that are members of the same account. For example, a particular cellular account may have five subscribers (e.g., five cellular telephones) that share a service unit consumption quota (e.g., 2 GB/month or 400 minutes/month) and/or that have a common service unit consumption counter that tracks consumption across all of the subscribers on the same account.

With current virtualized mobile networks, where Virtual Network Functions (VNFs) may provide mobile network service within multiple different network regions within the mobile network, attempting to maintain a consumption counter for an account with a shared consumption plan can be difficult with existing architectures. For example, in a Fifth Generation (5G) mobile network (e.g., per 3rd Generation Partnership Project (3GPP) standards), an Account Balance Management Function (ABMF) may be part of each Converged Charging System (CCS) within the mobile network. To track the network unit consumption of multiple subscribers associated with a single account, where the multiple subscribers may obtain network service in different regions of the mobile network, each ABMF located at each distributed CCS may have to periodically synchronize with every other ABMF to maintain an accurate and up-to-date value for each account's consumption counter. This approach would increase the amount of network signaling exponentially. Alternatively, a single centralized CCS, and its ABMF, may keep track of network unit consumption across multiple network regions of the mobile network. This alternative approach would result in an increase in latency/delay during session establishment and conduct of a session.

Embodiments described herein may remove the ABMF from the CCSs of the mobile network and may deploy the ABMF as a separate, centralized network component to maintain and track the network consumption counters for network service accounts. Subscribers may be provisioned in distributed instances of CCSs across the mobile network based on a geographic location of each subscriber, and the distributed CCS instances interface with the centralized ABMF to report consumptions of each subscriber. The centralized ABMF updates the consumption counter for each account, including multiple subscribers sharing consumption on each shared account, based on the reported consumption. Each CCS, located in a given network region, obtains a consumption quota for each account from the centralized ABMF and performs network quota management for each subscriber device in the account to avoid latency or delay.

FIG. 1 depicts an example of a network environment 100 in which network service unit consumption may be tracked and aggregated among multiple subscribers, located in multiple different geographic regions of the network, that are members of a single account. As shown, network environment 100 may include User Equipment devices 105-1 through 105-$n$ (generically referred to herein as a "UE 105" or "UEs 105"), a mobile network 110, and a data network 115.

UEs 105-1 through 105-$n$ may each include any type of device having a communication capability, such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A subscriber (also referred to herein as a "user") may carry, use, administer, and/or operate each UE 105. For example, a subscriber 120-1 is shown in association with UE 105-1 and a user 120-n is shown in association with UE 105-n.

Mobile network 110 may include a Public Land Mobile Network (PLMN) (referred to herein as a "mobile network 110" or a "network 110") and possibly one or more other networks (not shown). Mobile network 110 may include sub-networks, such as a Radio Access Network (RAN) 125, a mobile core network (not shown), and one or more edge networks (not shown). RAN 125 may include various types of radio access equipment that implement Radio Frequency (RF) communication with UEs 105. The radio access equipment of RAN 125 may include, for example, at least one Central Unit (CU) 135, one or more Distributed Units (DUs), and one or more Radio Units (RUs). Each CU 135 includes a network device that operates as a digital function unit that transmits digital baseband signals to the multiple DUs, and receives digital baseband signals from the multiple DUs. The RUs include network devices that operate as radio function units that transmit and receive RF signals to/from UEs 105. Each of the RUs may include at least one antenna array, transceiver circuitry, and other hardware and software components for enabling the RUs to receive data via wireless RF signals from UEs 105, and to transmit wireless RF signals to UEs 105. In implementations in which mobile network 110 is a 5G New Radio (NR) network (such as shown in FIG. 1), a CU and DUs represent a distributed Next Generation NodeB, which may also be referred to herein as a "gNB" or a "base station." The CU 135 and DUs may also represent an enhanced LTE (eLTE) eNB, also referred to herein as a "base station," that can connect to mobile network 110. RAN 125 may additionally include other nodes, functions, and/or components not shown in FIG. 1.

The mobile core network and/or the one or more edge networks may include network devices (not shown) that execute various network functions (NFs), such as, for example, VNFs, for managing mobile network 110 and/or handling session traffic for subscribers within mobile network 110. The mobile core network and/or the one or more edge networks may be organized into multiple geographic network regions, referred to herein as "zones." Therefore, first NFs disposed in the mobile core network and/or the one or more edge networks for handling UE sessions within a first geographic network region of mobile network 110 may be located within "zone 1," second NFs disposed in the mobile core network and/or the one or more edge networks for handling UE sessions within a second geographic network region of mobile network 110 may be located within "zone 2," etc. The mobile network 110 is depicted in FIG. 1 as having a single zone x 130. Mobile network 110, however, may include multiple different zones 130, with each zone encompassing a different geographic region within mobile network 110 and servicing UEs 105 within that geographic region.

The zones 130 of mobile network 110 each include devices or nodes that perform NFs that handle network service for UEs 105 located within each of the zones of the mobile network 110. Each of the zones 130 may include, among other NFs, mobile network access management, session management, and policy control NFs. In the example network environment 100 of FIG. 1, zone x 130 is shown as including 5G NFs, such as a Session Management Function (SMF) 145, an Access and Mobility Management Function (AMF) 150, a Unified Data Management (UDM) function 155, a Policy Control Function (PCF) 160, and a Converged Charging System (CCS) 165. Mobile network 110 is further shown as including an account grouper 170, and a User Plane Function (UPF) 140. UPF 140 may, or may not, reside within a particular zone x 130, and mobile network 110 may include multiple UPFs 140 located at distributed locations within mobile network 110. In some implementations (not shown in FIG. 1), each zone x 130 may have one or more UPFs 140 located within the zone x 130 for handling user plane traffic for that particular zone. As described further below with respect to FIG. 3, UPF 140, SMF 145, AMF 150, UDM 155, PCF 160, CCS 165, and account grouper 170 may be implemented as VNFs and installed within data centers within mobile network 110.

UPF 140 may act as a router and a gateway between mobile network 110 and data network 115 and may forward session data between data network 115 and RAN 125. SMF 145 performs session management, allocates network addresses to UEs 105, and selects and controls UPFs 140 for data transfer. AMF 150 performs authentication, authorization, and mobility management for UEs 105. UDM 155 manages data for user access authorization, user registration, and data network profiles. UDM 155 may include, or operate in conjunction with, a User Data Repository (UDR—not shown) which stores user data, such as customer profile information, customer authentication information, and encryption keys. PCF 160 implements policy and charging control for service data flows and Protocol Data Unit (PDU) session related policy control. CCS 165 may implement various functions associated with tracking and managing network service unit consumption, including, among other functions, a Charging Gateway Function (CGF) (not shown) and a Charging Function (CHF) 175. The CGF and CHF 175 collect network and service usage data, including data related to network service units consumed by each UE 105 within their zone 130. The CGF and CHF create Charging Data Records (CDRs) that include a formatted collection of information about a chargeable event involving network service unit consumption within mobile network 110. Account Grouper 170 includes, among other functions, an ABMF 180 that maintains a consumption counter for each account and tracks network service unit usage among the multiple subscribers/subscriber devices associated with each account.

Data network 115 may include one or more interconnected networks, such as local area networks (LANs), wide area networks (WANs), metropolitan area networks (MANs), and/or the Internet. Data network 115 may connect with UPFs 140 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, mobile network 110 may include other NFs not shown in FIG. 1. Though mobile network 110 is depicted in FIG. 1 as a 5G network having 5G network components/functions, mobile network 110 may alternatively include a Fourth Generation (4G) or 4.5G network with corresponding network components/functions, or a hybrid Next Generation/4G network that includes certain components of both a Next Generation network (e.g., a 5G network) and a 4G network. Additionally, though only a single zone x 130 is shown in FIG. 1, mobile network 110 may include multiple (>2) zones 130, with each zone 130 having its own SMF 145, AMF 150, UDM 155, PCF 160, and/or CCS 165. Mobile network 110 may, therefore, have multiple instances of each of the NFs shown in FIG. 1.

Figure 2:
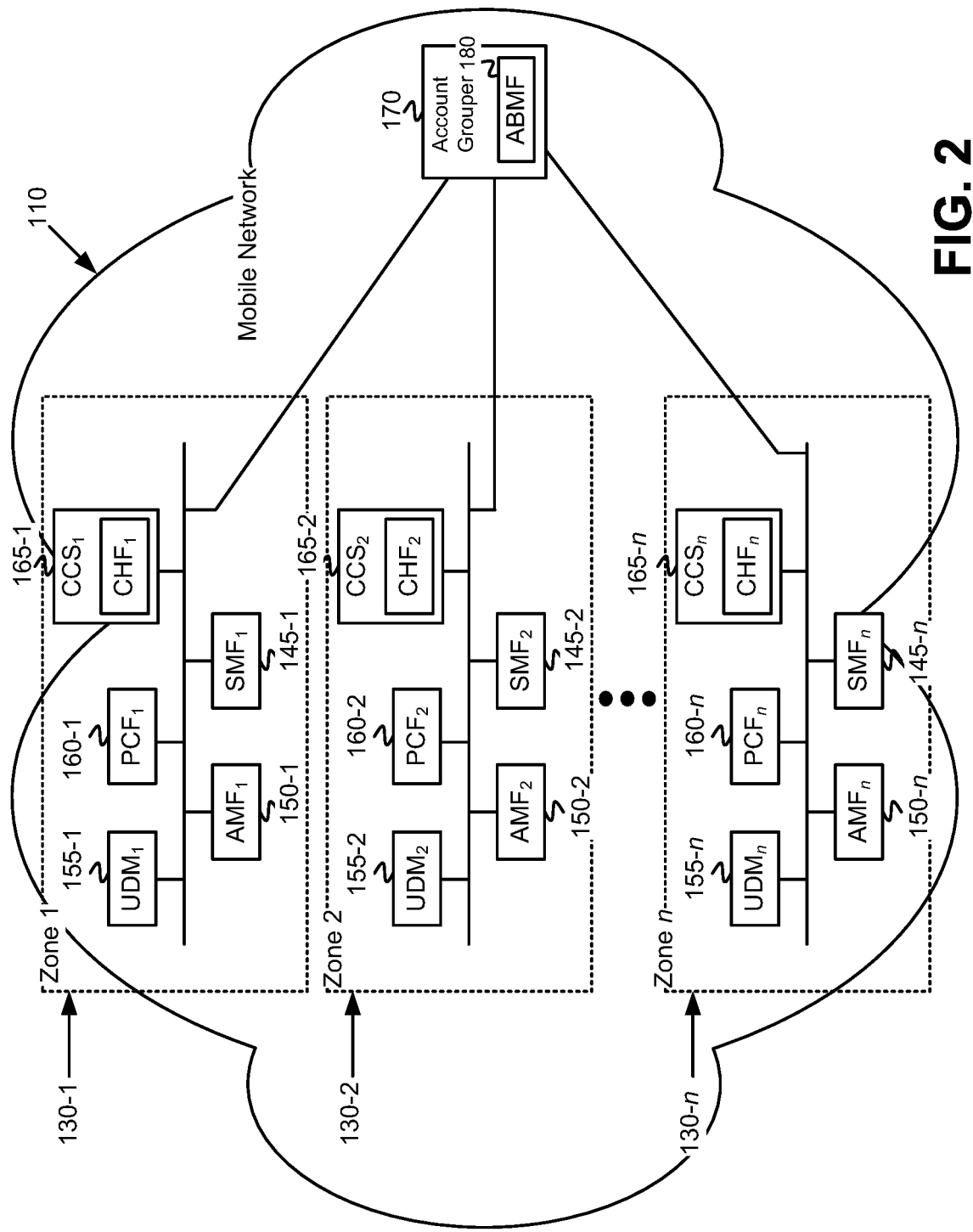
FIG. 2 depicts an example of multiple zones within a mobile network, where each zone is associated with a particular geographic region of the mobile network.

FIG. 2 depicts an example of multiple zones 130-1 through 130-n within mobile network 110, where each zone 130 may be associated with a particular geographic region of mobile network 110. For example, zone 1 130-1 includes its own NFs that serve the geographic region associated with zone 1 130-1, including, among other NFs, a SMF 145-1, an AMF 150-1, an UDM 155-1, a PCF 160-1, and a CCS 165-1. Zone 2 130-2 includes its own NFs that serve the geographic region associated with zone 2 130-2, including, among other NFs, a SMF 145-2, an AMF 150-2, an UDM 155-2, a PCF 160-2, and a CCS 165-2. Zone n 130-n includes its own NFs that serve the geographic region associated with Zone n 130-n, including, among other NFs, a SMF 145-n, an AMF 150-n, an UDM 155-n, a PCF 160-n, and a CCS 165-n. The NFs of zone 1 130-1 through zone n 130-n may communicate with centralized account grouper 170 such that account grouper 170 can aggregate, across multiple zones 130, network consumption units among multiple subscribers that may, for example, be associated with a same network service account.

Figure 3:
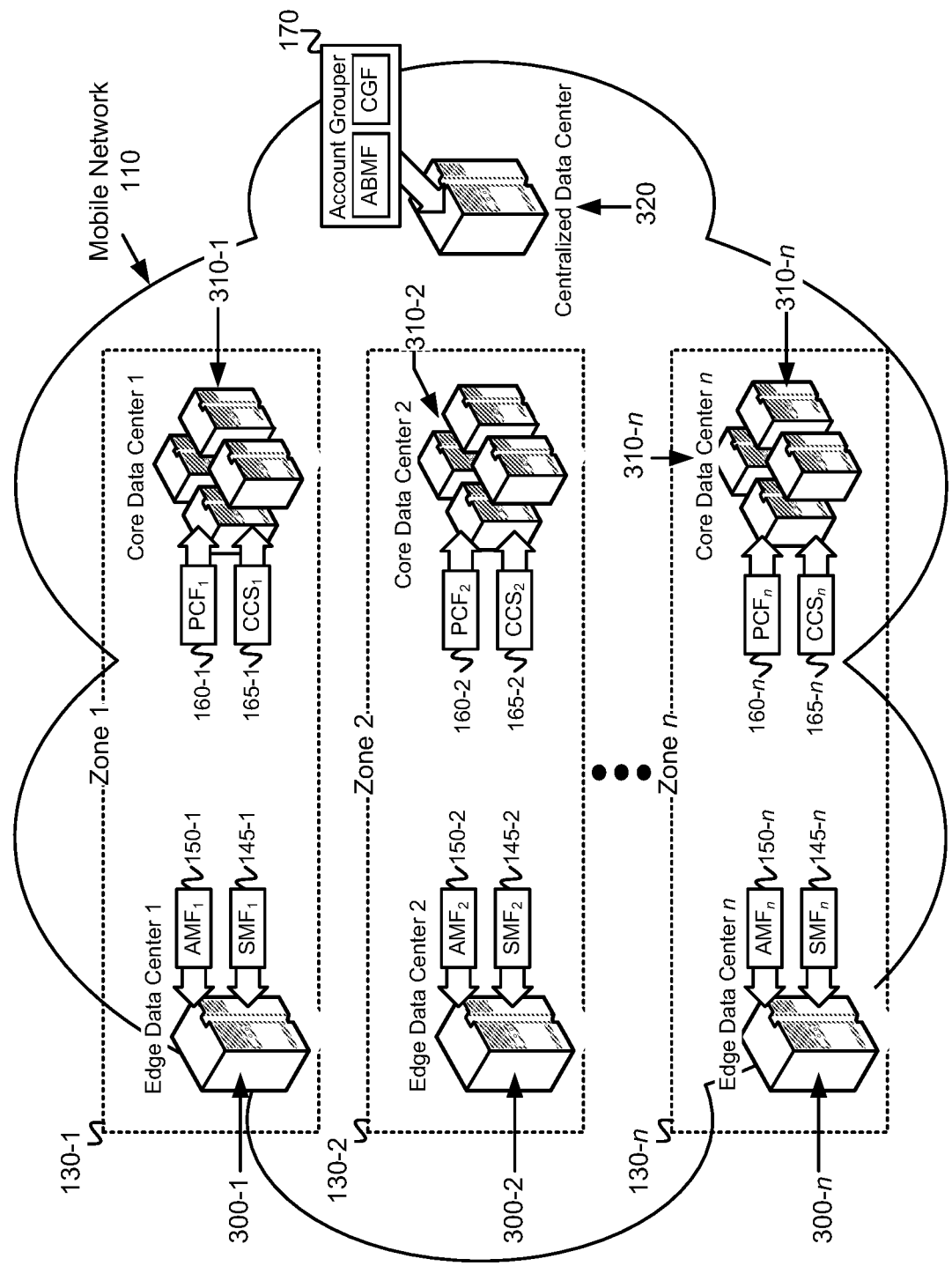
FIG. 3 illustrates an example of the distribution of mobile network functions (NFs) and an account grouper among multiple different data centers within different zones of the mobile network.

FIG. 3 illustrates an example of the distribution of mobile network NFs and account grouper 170 among multiple different data centers within different zones 130 of mobile network 110. In this example of FIG. 3, account grouper 170, including ABMF 180, may be installed at a data center 320 that is centralized, with respect to its geographic location, relative to data centers that are located within each of the zones 130. As shown, zone 1 130-1 may include an edge data center 300-1 and a core data center 310-1 that are located within the network region encompassing zone 1 130-1. Zone 2 130-3 may include an edge data center 300-2 and a core data center 310-2 that are located within the network region encompassing zone 2 130-2. Zone n 130-n may include an edge data center 300-n and a core data center 310-n that are located within the network region encompassing zone n 130-n. The disposition of edge data centers 300 and core data centers 310 within different network regions (e.g., zones) reduces latency and enables quicker signaling associated with network service to UEs 105 receiving network service within particular network regions. Different mobile network NFs may, therefore, be installed at different data centers 300 or 310 at different locations within each zone 130 based on, among other factors, a desired latency associated with signaling/traffic involving the NFs. An AMF 150 and a SMF 145, for example, may be installed at an edge data center 300 at a location within a zone 130, whereas other NFs, such as PCF 160 and CCS 165, may be installed at a core data center 310 at another location within the zone 130.

Edge data center 300-1 may be located within zone 1 130-1 at an edge of mobile network 110 and may have one or more NFs (e.g., AMF 150-1, SMF 145-1) associated with providing network service in zone 1 130-1 installed. Edge data center 300-2 may be located within zone 2 130-2 at an edge of mobile network 110 and similarly may have one or more NFs (e.g., AMF 150-2, SMF 145-2) associated with providing network service in zone 2 130-2 installed. Edge data center 300-n may be located within zone n 130-n at an edge of mobile network 110 and may also have one or more NFs (e.g., AMF 150-n, SMF 145-n) associated with providing network service in zone n 130-n installed.

Core data center 310-1 may be located within the core network (not shown) of mobile network 110 within zone 1 130-1, and may have one or more NFs (e.g., PCF 160-1, CCS 165-1) associated with providing network service in zone 1 130-1 installed. Core data center 310-2 may be located within the core network (not shown) of mobile network 110 within zone 2 130-2, and may have one or more NFs (e.g., PCF 160-2, CCS 165-2) associated with providing network service in zone 2 130-2 installed. Core data center 310-n may be located within the core network (not shown) of mobile network 110 within zone n 130-n, and may have one or more NFs (e.g., PCF 160-n, CCS 165-n) associated with providing network service in zone n 130-n installed.

Mobile network 110 may further include a data center 320 that may be located at a geographic location within mobile network 110 that may be centralized relative to zones 130-1-130-n. Data center 320 may connect to data centers 300-1 through 300-n and data centers 310-1 through 310-n. Account grouper 170 may be installed at data center 320 and may receive network unit consumption data, associated with multiple subscribers (not shown in FIG. 3), from CCS 165-1 through 165-n across multiple zones 130-1 through 130-n.

Figure 4:
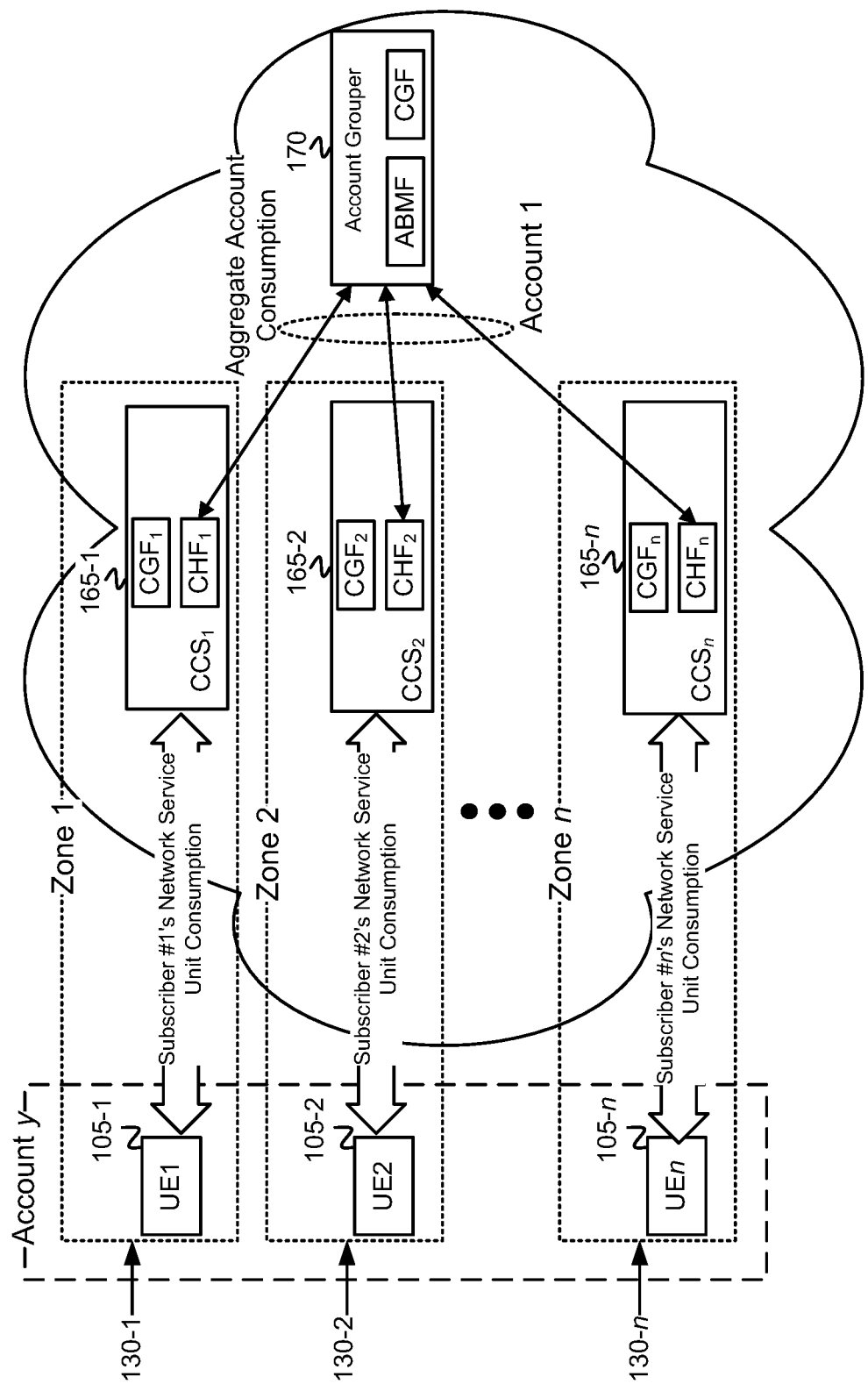
FIG. 4 depicts an example of the aggregation of network service unit consumption by multiple subscribers, across multiple zones, that are members of a same account.

FIG. 4 depicts an example of the aggregation of network service unit consumption by multiple subscribers, across multiple zones, that are members of a same account (account y). In this example, UE 105-1, UE 105-2, and UE 105-n are each associated with a different one of multiple subscribers who are all are members of a same account. The account may have shared network service unit consumption (e.g., air-time minutes or quantity of data) among the multiple subscribers. As shown, a first UE 105-1, located in zone 1 130-1 and associated with a first subscriber (not shown), engages in a session(s) that involves consumption of network service units (e.g., Megabytes (MB) of data). CCS 165-1 reports the network service unit consumption for UE 105-1 to account grouper 170. Account grouper 170 updates the consumption counter for the account (Account y) to reflect the additional network service unit consumption by UE 105-1.

A second UE 105-2, located in zone 2 130-2 and associated with a second subscriber (not shown), engages in a session(s) that involves consumption of network service units. CCS 165-2 reports the network service unit consumption for UE 105-2 to account grouper 170. Account grouper 170 updates the consumption counter for the account (Account y) to reflect the additional network service unit consumption by UE 105-2. An nth UE 105-n, located in zone n 130-n and associated with an nth subscriber (not shown), further engages in a session(s) that involves consumption of network service units. CCS 165-n reports the network service unit consumption for UE 105-n to account grouper 170. Account grouper 170 updates the consumption counter for the account (Account y) to reflect the additional network service unit consumption by UE 105-n.

Figure 5:
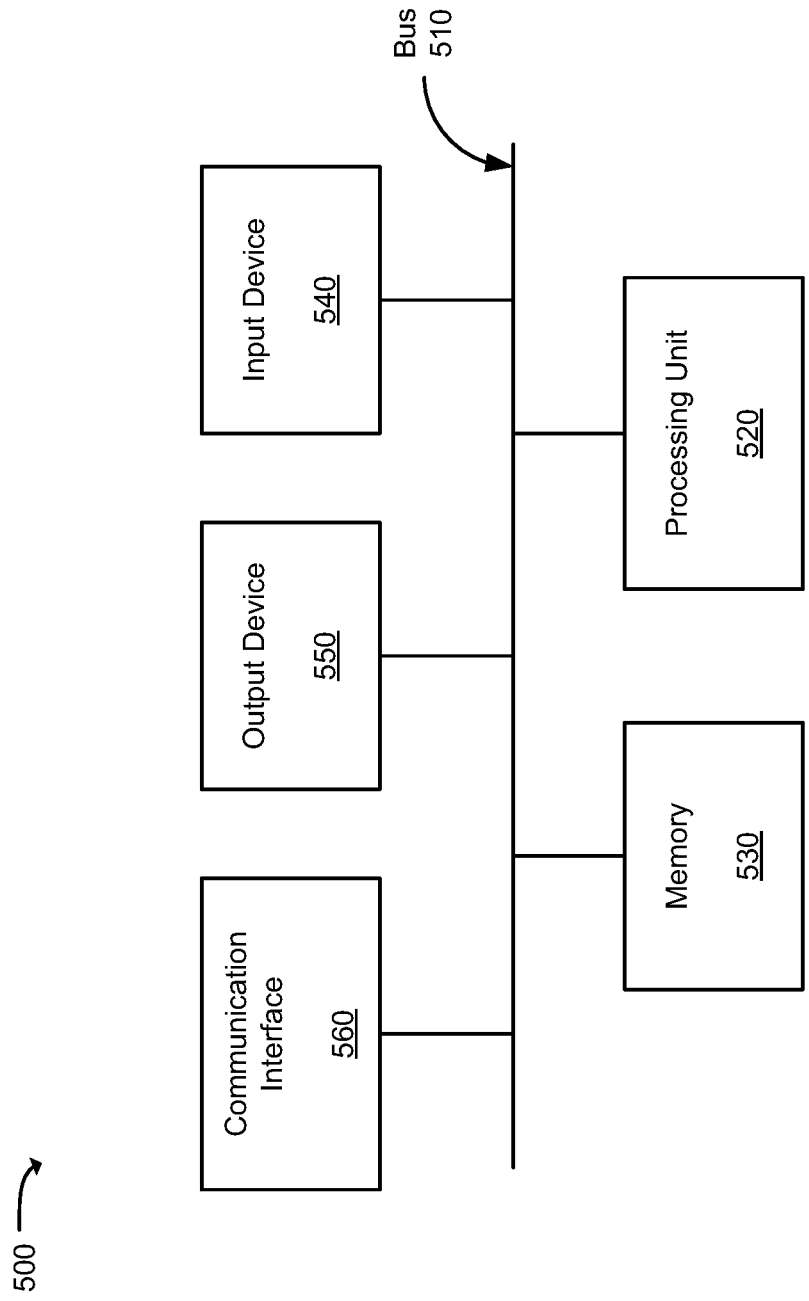
FIG. 5 is a diagram that depicts exemplary components of a network device used herein.

FIG. 5 is a diagram that depicts exemplary components of a network device 500 (referred to herein as a "network device" or a "device"). UEs 105, and the CUs 135, DUs, and/or RUs of RAN 125 may include one or more components that are the same as, or similar to, those of device 500 shown in FIG. 5. Furthermore, each of the NFs UPF 140, SMF 145, AMF 150, UDM 155, PCF 160, CCS 165, account grouper 170, CHF 175, and/or ABMF 180 may be implemented by a network device (e.g., such as a data center 300, 310, or 320 shown in FIG. 3) that includes one or more components that are the same as, or similar to, those of device 500. Some of the NFs may be implemented by a same device 500 within mobile network 110, while others of the functions may be implemented by one or more separate devices 500 within mobile network 110.

Device 500 may include a bus 510, a processing unit 520, a memory 530, an input device 540, an output device 550, and a communication interface 560. Bus 510 may include a path that permits communication among the components of device 500. Processing unit 520 may include one or more processors or microprocessors which may interpret and execute instructions, or processing logic. Memory 530 may include one or more memory devices for storing data and instructions. Memory 530 may include a random access memory (RAM) or another type of dynamic storage device that may store information and instructions for execution by processing unit 520, a Read Only Memory (ROM) device or another type of static storage device that may store static information and instructions for use by processing unit 520, and/or a magnetic, optical, or flash memory recording and storage medium. The memory devices of memory 530 may each be referred to herein as a "tangible non-transitory computer-readable medium," "non-transitory computer-readable medium," or "non-transitory storage medium." In some implementations, the processes/methods set forth herein can be implemented as instructions that are stored in memory 530 for execution by processing unit 520.

Input device 540 may include one or more mechanisms that permit an operator to input information into device 500, such as, for example, a keypad or a keyboard, a display with a touch sensitive panel, voice recognition and/or biometric mechanisms, etc. Output device 550 may include one or more mechanisms that output information to the operator, including a display, a speaker, etc. Input device 540 and output device 550 may, in some implementations, be implemented as a user interface (UI) that displays UI information and which receives user input via the UI. Communication interface 560 may include a transceiver(s) that enables device 500 to communicate with other devices and/or systems. For example, communication interface 560 may include one or more wired and/or wireless transceivers for communicating via mobile network 110 and/or data network 115. In the case of RUs of RAN 125, communication interface 560 may further include one or more antenna arrays for producing radio frequency (RF) cell sectors.

The configuration of components of network device 500 illustrated in FIG. 5 is for illustrative purposes. Other configurations may be implemented. Therefore, network device 500 may include additional, fewer and/or different components, that may be arranged in a different configuration, than depicted in FIG. 5.

Figure 6A:
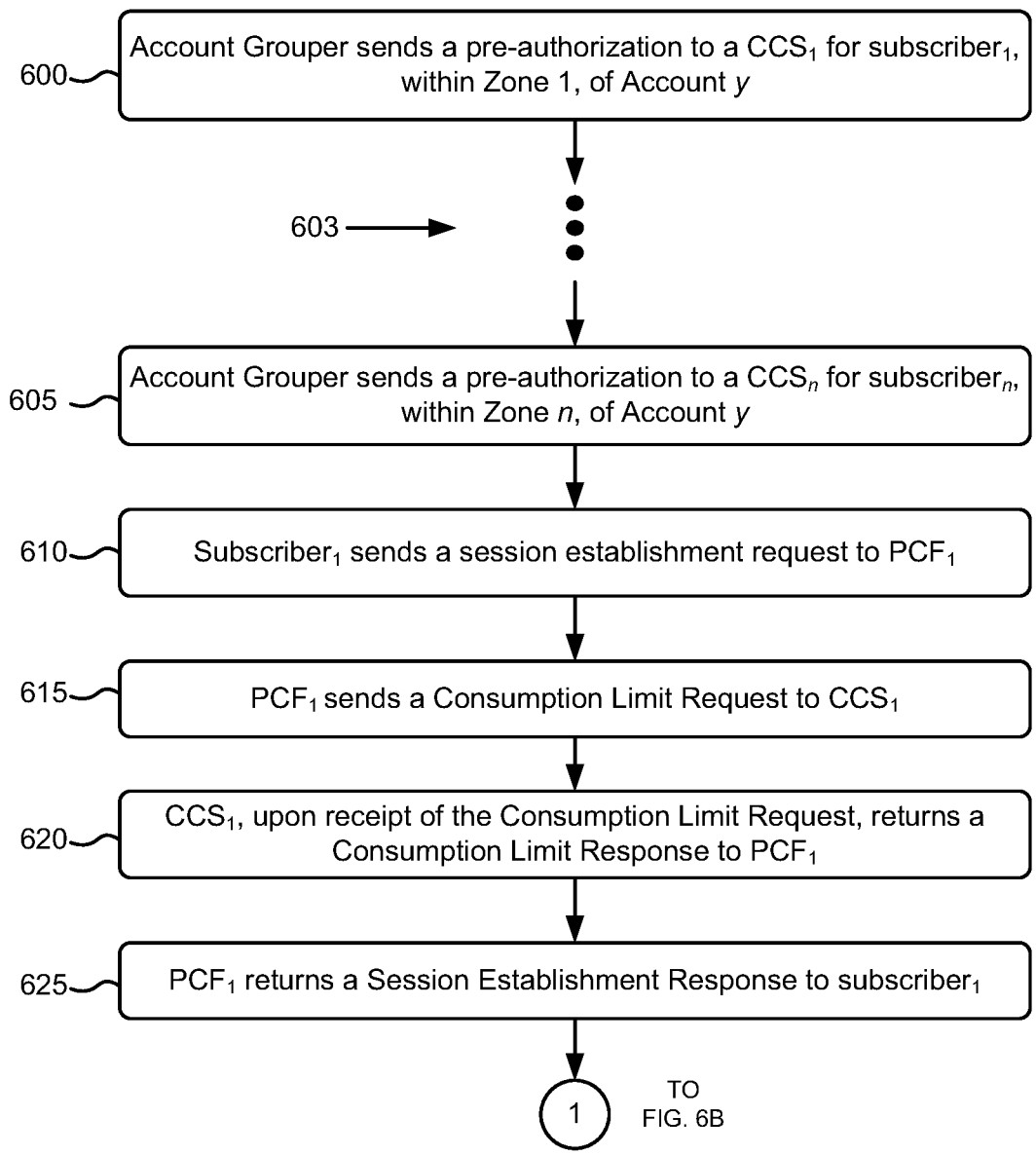
FIGS. 6A and 6B are flow diagrams of an example process for account consumption limit management and session establishment for a single account which includes multiple subscribers.
Figure 6B:
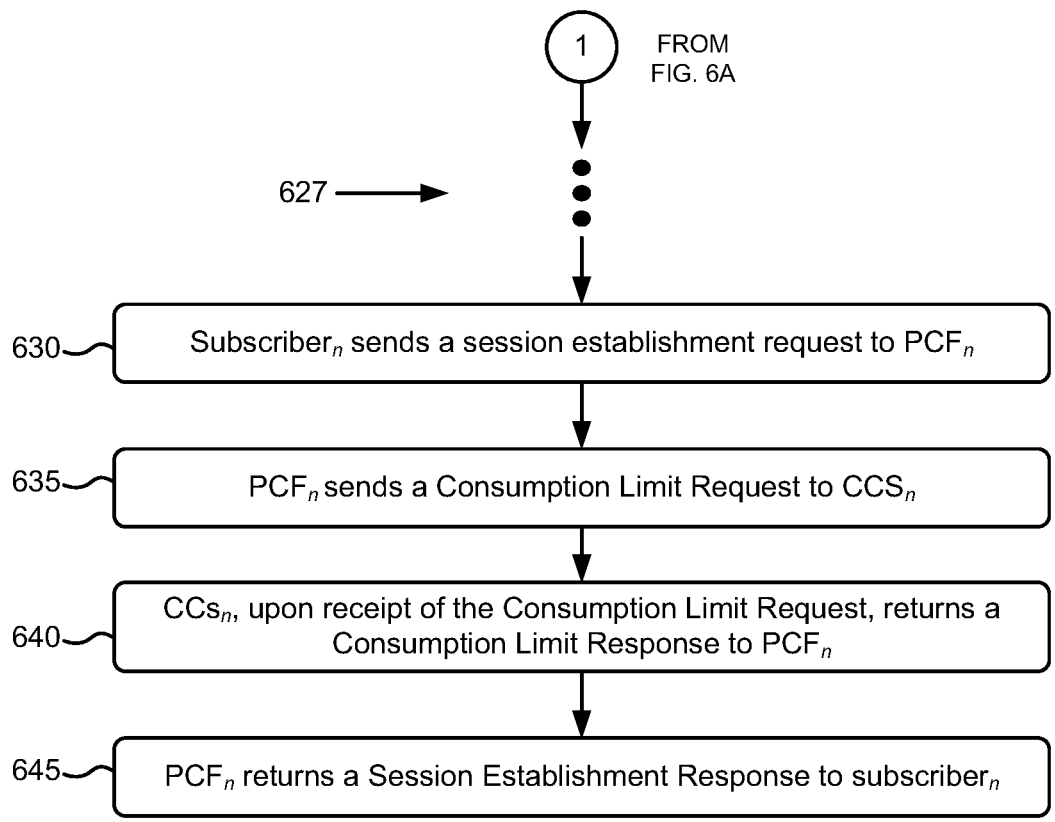

FIGS. 6A and 6B are flow diagrams of an example process for session establishment and account consumption limit management for a single account which includes multiple subscribers. The exemplary process of FIGS. 6A and 6B may be implemented by various NFs (e.g., PCFs 160, CCSs 165, account grouper 170) of mobile network 110. The example process of FIGS. 6A and 6B is described with additional reference to the operations, messages, and data flow diagram of FIG. 7.

Figure 7:
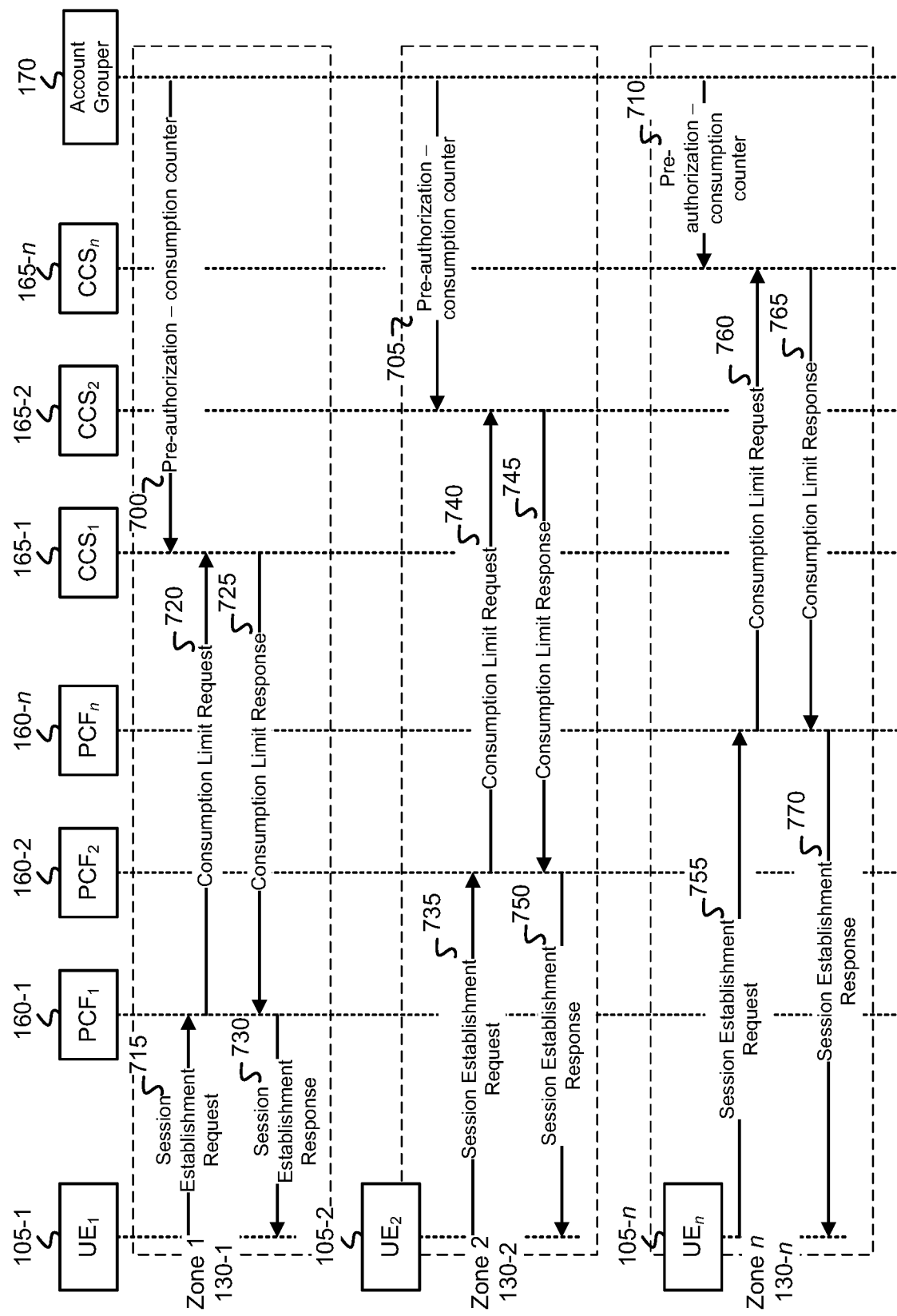
FIG. 7 depicts exemplary operations, messages, and data flows associated with an example process.

The example process includes account grouper 170 sending a pre-authorization to each $CCS_x$, 165 within a respective $zone_x$ 130 for each $subscriber_x$ of account y currently located within the $zone_x$ 130. For example, account grouper 170 may send a pre-authorization to a CCS 165-1 for a $subscriber_1$, within a zone 1 130-1 for account y, based on a consumption counter for account y (block 600). The pre-authorization may occur, for example, during service activation for $subscriber_x$ within mobile network 110. The pre-authorization from account grouper 170 to a CCS 165-$x$ within a $zone_x$ 130, for the $subscriber_x$, may include a current consumption counter value, and/or a consumption quota (e.g., minutes, data quantity), for the account y of which $subscriber_x$ is a member. The consumption quota may include, for example, a maximum number of network service units (e.g., minutes, MB of data) to be shared among all of the subscribers that are members of the account y. Block 600 may be repeated, as shown at 603 in FIG. 6A, for each $subscriber_x$ of n subscribers within a zone x 130 for the Account y, with pre-authorization concluding with account grouper 170 sending a pre-authorization to a CCS 165-$n$ for a $subscribers_n$ within a zone n 130-$n$, for the Account y based on a consumption counter for Account y (block 605). Referring to FIG. 7, account grouper 170 is shown sending a pre-authorization 700 to a $CCS_1$ 165-1 within zone 1 130-1, a pre-authorization 705 to a $CCS_2$ 165-2 in zone 2 130-2, and a pre-authorization 710 to a $CCS_n$ 165-$n$ within zone n 130-$n$, where each of the pre-authorizations includes a current consumption counter value (e.g., a consumption quota) for the account y.

The process continues with session establishment occurring between each $subscriber_x$ and a $PCF_x$ within a zone x of mobile network 110. For example, $subscriber_1$ sends a session establishment request to $PCF_1$ within zone 1 130-1 (block 610). The session establishment request, sent from a UE 105, may encounter other nodes (omitted from FIG. 7 below for purposes of simplicity) of the mobile network before reaching $PCF_1$. For example, the UE 105 may send the session establishment request to AMF 150, which, in turn, sends the session establishment request to SMF 145. SMF 145, also in turn, sends the session establishment request to $PCF_1$. $PCF_1$, upon receipt of the session establishment request, sends a Consumption Limit Request to $CCS_1$ (block 615), and $CCS_1$, upon receipt of the Consumption Limit Request, returns a Consumption Limit Response to $PCF_1$ (block 620). $PCF_1$ returns a Session Establishment Response to $subscriber_1$ (block 625).

Referring to FIG. 7, $UE_1$ 105-1 is shown sending a session establishment request 715 to $PCF_1$ 160-1 in $Zone_1$ 130-1 and $PCF_1$ 160-1, in turn, sending a Consumption Limit Request 720 to $CCS_1$ 165-1. $CCS_1$ 165-1 performs a lookup to retrieve the previously received consumption quota or counter value for the account y of which the $subscriber_1$ associated with $UE_1$ 105-1 is a member. $CCS_1$ 165-1 sends a Consumption Limit Response 725 to $PCF_1$ 160-1 that includes the current consumption quota or counter value for the account y. $PCF_1$ 160-1, in turn, returns a Session Establishment Response 730 to $UE_1$ 105-1.

Blocks 610-625 may be repeated, as shown at 627 in FIG. 6B, for each $subscriber_x$ of n subscribers located within a zone x for the Account y, with session establishment proceeding for a $subscribers_n$ at blocks 630-645. For example, $subscribers_n$ sends a session establishment request to $PCF_n$ within zone n 130-$n$ (block 630). The session establishment request, sent from a UE 105$_n$, may encounter other nodes (omitted from FIG. 7 below for purposes of simplicity) of the mobile network before reaching $PCF_n$. For example, the UE 105$_n$ may send the session establishment request to AMF 150$_n$, which, in turn, sends the session establishment request to SMF 145$_n$. SMF 145$_n$, in turn, sends the session establishment request to $PCF_n$. $PCF_n$, upon receipt of the session establishment request, sends a Consumption Limit Request to $CCS_n$ (block 635), and $CCS_n$, upon receipt of the Consumption Limit Request, returns a Consumption Limit Response to PCF$_n$ (block 640). PCF$_n$ returns a Session Establishment Response to subscribers (block 645).

Referring again to FIG. 7, UE$_2$ 105-2 is shown sending a session establishment request 735 to PCF$_2$ 160-2 in Zone$_2$ 130-2 and PCF$_2$ 160-2, in turn, sending a Consumption Limit Request 740 to CCS$_2$ 165-2. CCS$_2$ 165-2 performs a lookup to retrieve the previously received consumption quota or counter value for the account y of which the subscriber$_2$ associated with UE$_2$ 105-2 is a member. CCS$_2$ 165-2 sends a Consumption Limit Response 745 to PCF$_2$ 160-2 that includes the current consumption quota or counter value for the account y. PCF$_2$ 160-2, in turn, returns a Session Establishment Response 750 to UE$_2$ 105-2.

UE$_n$ 105-$n$ is further shown sending a session establishment request 755 to PCF$_n$ 160-$n$ in Zone$_n$ 130-$n$ and PCF$_n$ 160-$n$, in turn, sending a Consumption Limit Request 760 to CCS$_n$ 165-$n$. CCS$_n$ 165-$n$ performs a lookup to retrieve the previously received consumption quota or counter value for the account y of which the subscribers associated with UE$_n$ 105-$n$ is a member. CCS$_n$ 165-$n$ sends a Consumption Limit Response 765 to PCF 160-$n$ that includes the current consumption quota or counter value for the account y. PCF 160-$n$, in turn, returns a Session Establishment Response 770 to UE$_n$ 105-$n$.

Figure 8A:
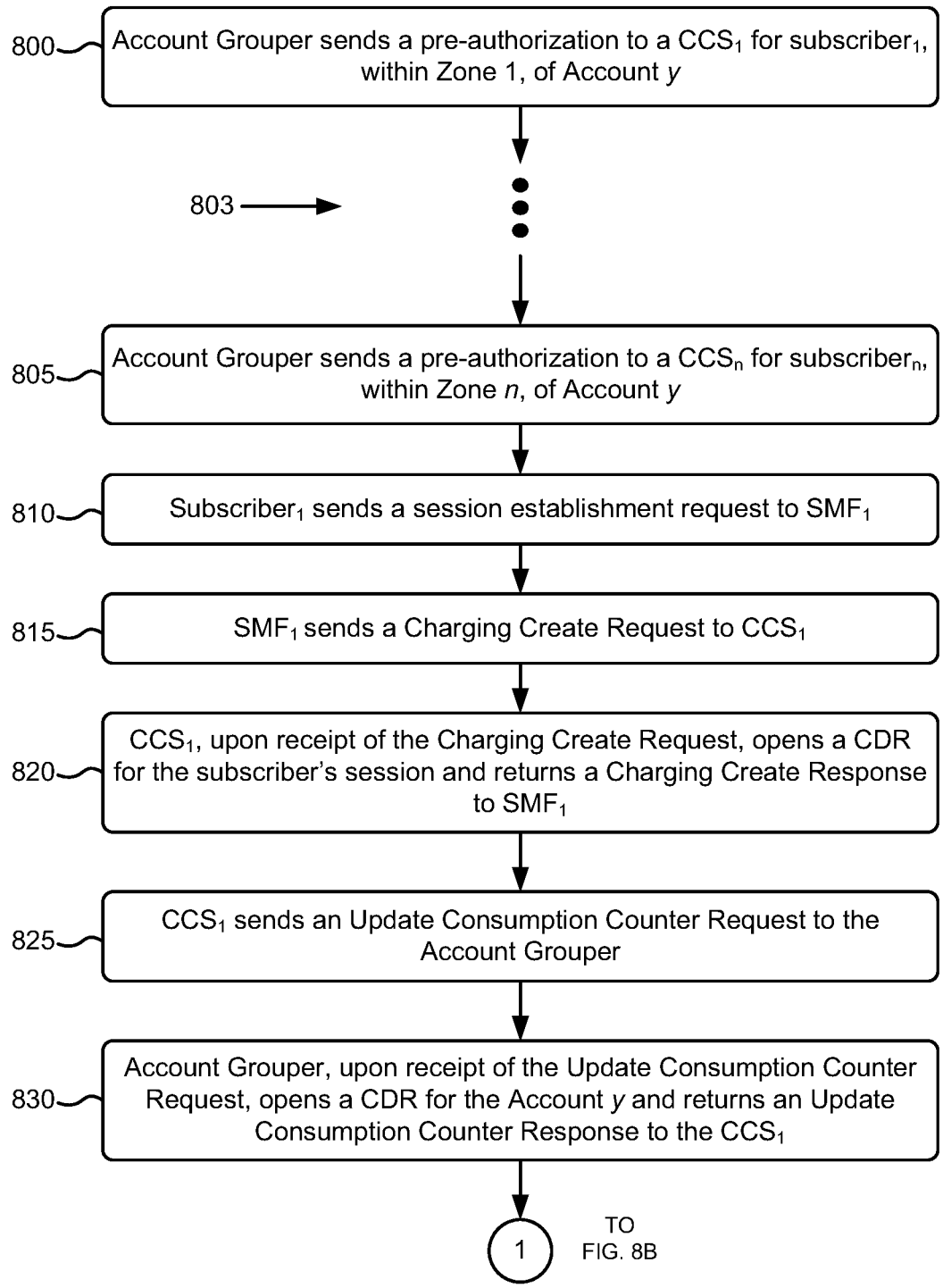
FIGS. 8A and 8B are flow diagrams of an example process for creation of a Charging Data Record (CDR) during session establishment involving subscribers that are members of a same account.
Figure 8B:
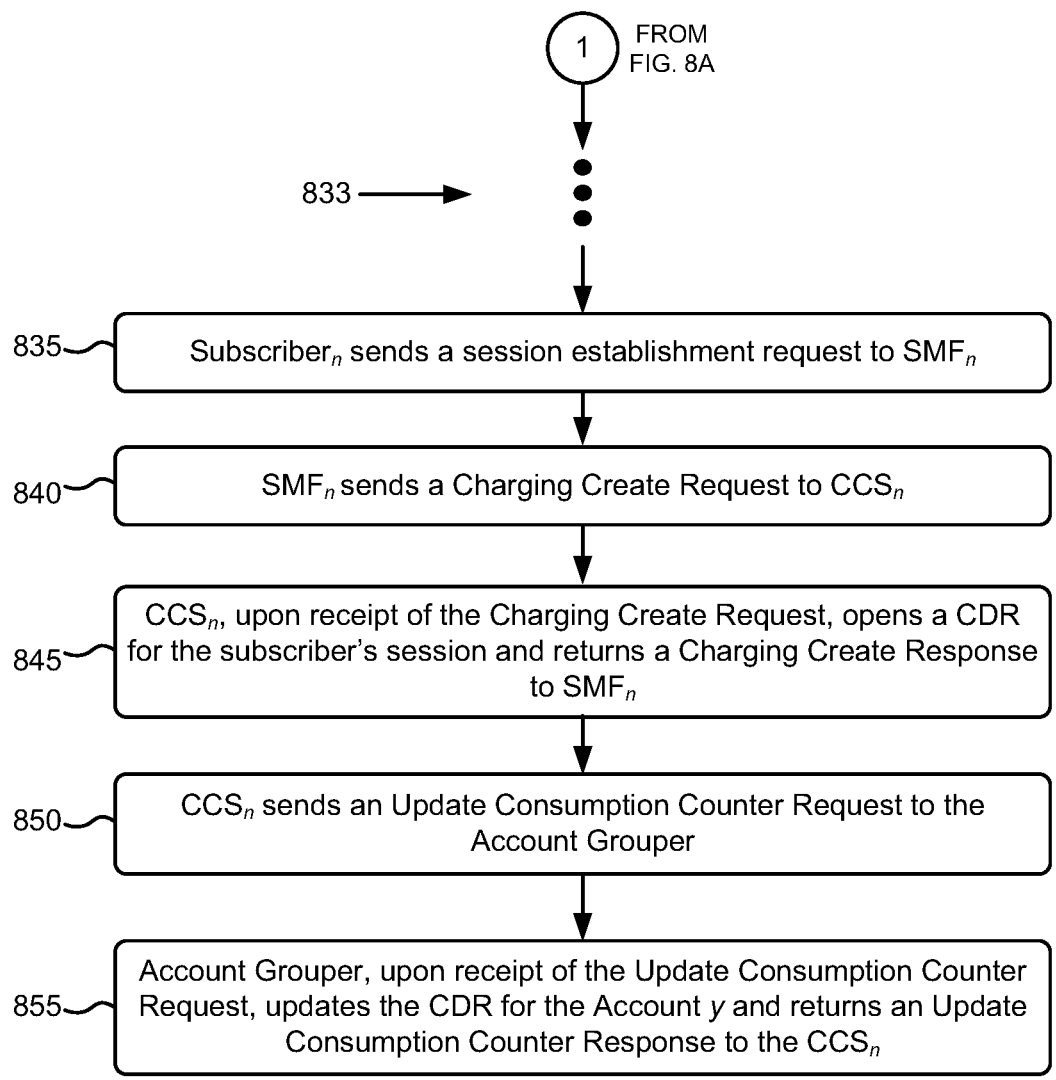

FIGS. 8A and 8B are flow diagrams of an example process for creation of a Charging Data Record (CDR) during session establishment involving subscribers that are members of a same account. The exemplary process of FIGS. 8A and 8B may be implemented by various NFs (e.g., SMFs 145, CCSs 165, account grouper 170) within mobile network 110. The example process of FIGS. 8A and 8B is described with additional reference to the operations, messages, and data flow diagrams of FIGS. 9A and 9B.

The example process includes account grouper 170 sending a pre-authorization to each CCS$_x$ within a respective zone$_x$, for each subscriber$_x$ of account y currently located within the zone$_x$. For example, ABMF 180 of account grouper 170 may send a pre-authorization to a CCS 165-1 for a subscriber$_1$, within a zone 1 130-1 for account y, based on a consumption counter for account y (block 800). The pre-authorization may occur, for example, during service activation for subscriber$_x$ within mobile network 110. The pre-authorization from ABMF 180 of account grouper 170 to a CCS 165-$x$ within a zone$_x$ 130, for the subscriber$_x$, may include a current consumption counter value, and/or a consumption quota (e.g., minutes, data quantity), for the account y of which subscriber$_x$ is a member. The consumption quota may include, for example, a maximum number of network service units (e.g., minutes, MB of data) to be shared among all of the subscribers that are members of the account y.

Figure 9A:
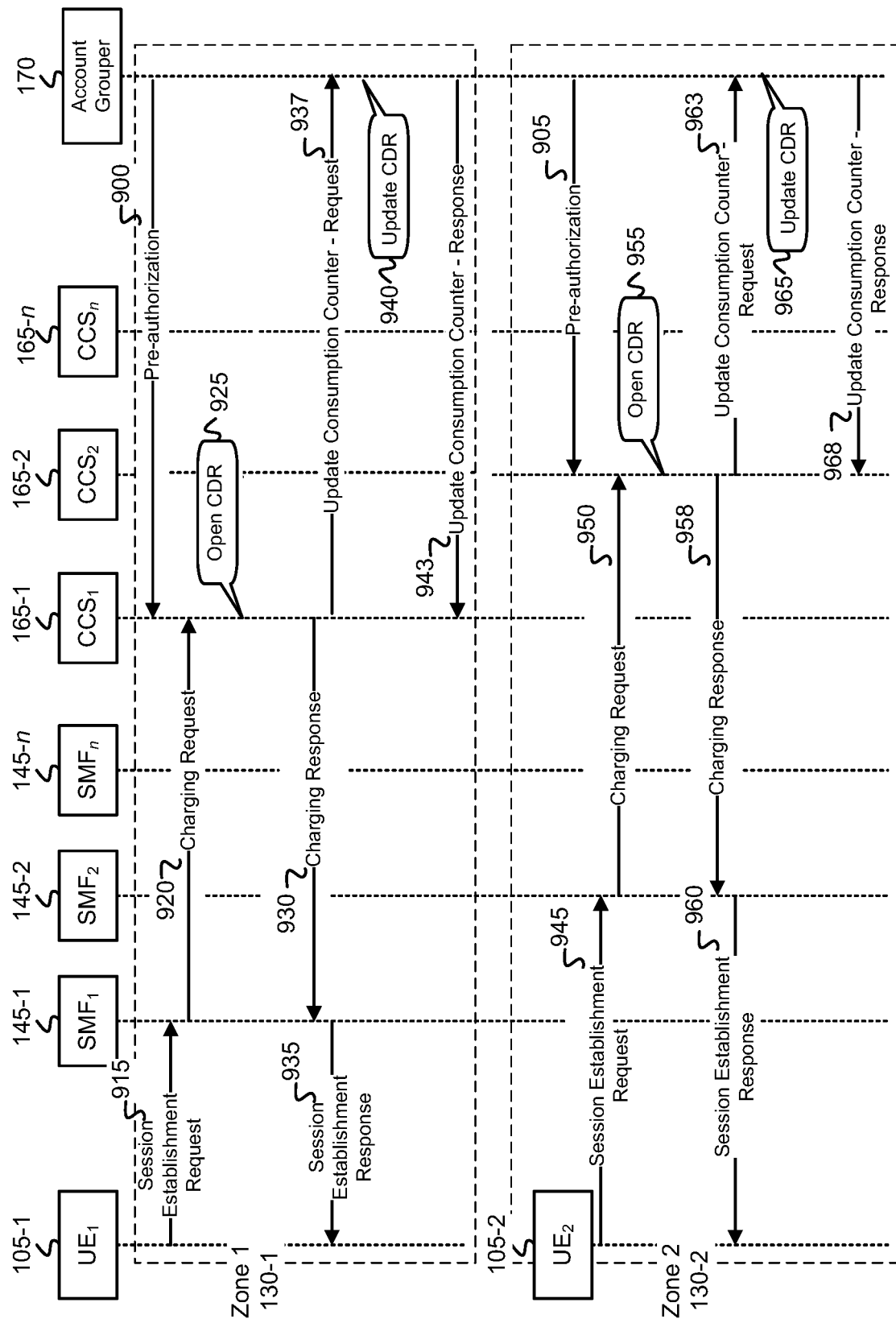
FIGS. 9A and 9B depict exemplary operations, messages, and data flows associated with another example process.
Figure 9B:
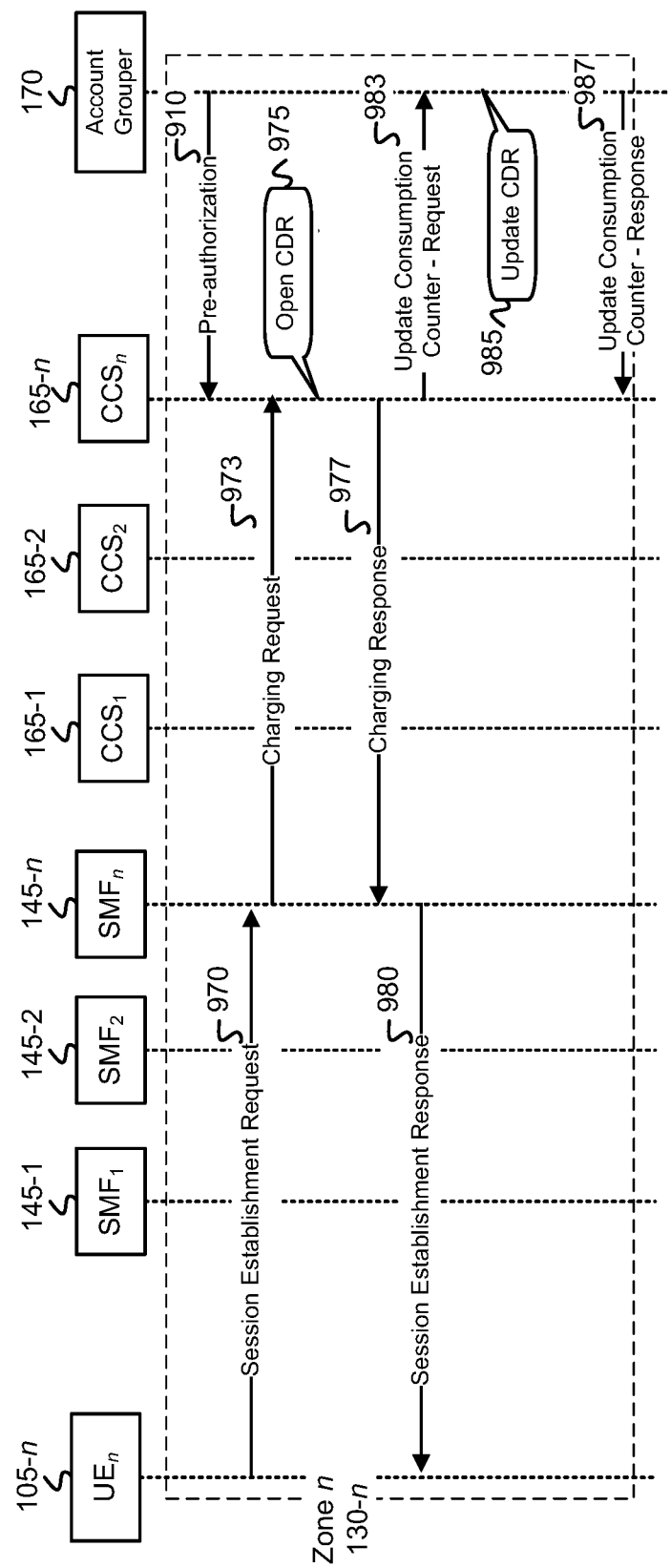

Block 800 may be repeated, as shown at 803 in FIG. 8A, for each subscriber$_x$ of n subscribers located within a zone x 130 for the account y, with pre-authorization proceeding with ABMF 180 of account grouper 170 sending a pre-authorization to a CCS 165-$n$ for a subscribers, within a zone n 130-$n$, for the account y based on a consumption counter for account y (block 805). Referring to FIGS. 9A and 9B, account grouper 170 is shown sending a pre-authorization 900 (FIG. 9A) to a CCS 165-1 within zone$_1$ 130-1, a pre-authorization 905 to a CCS 165-2 in zone$_2$ 130-2, and a pre-authorization 910 (FIG. 9B) to a CCS 165-$n$ within zone$_n$ 130-$n$, where each of the pre-authorizations includes a current consumption counter value (e.g., a consumption quota) for the account y shared among the multiple subscribers.

The process continues with session establishment, and CDR creation for the session, occurring for each subscriber$_x$ within a zone x 130 of mobile network 110. For example, subscriber$_1$ sends a session establishment request to SMF 145-1 within zone$_1$ 130-1 (block 810). The session establishment request, sent from a UE 105, may encounter other nodes (omitted from FIGS. 9A and 9B below for purposes of simplicity) of the mobile network before reaching SMF$_1$. For example, the UE 105 may send the session establishment request to AMF$_1$ 150, which, in turn, sends the session establishment request to SMF$_1$ 145. SMF 145-1, upon receipt of the session establishment request, sends a Charging Create Request to CCS$_1$ (block 815), and CCS 165-1 opens a CDR for the subscriber's session and returns a Charging Create Response to the SMF$_1$ (block 820). Further, CCS 165-1 sends an Update Consumption Counter Request to account grouper 170 (block 825). Account grouper 170, upon receipt of the Update Consumption Counter Request, opens a CDR for the account y and returns an Update Consumption Counter Response to the CCS 165-1 (block 830).

Referring to FIG. 9A, UE$_1$ 105-1 is shown sending a session establishment request 915 to SMF 145-1 in Zone$_1$ 130-1 and SMF 145-1, in turn, sending a Charging Request 920 to CCS 165-1. CCS 165-1 opens 925 a CDR, for tracking the subscriber's consumption for the session, and returns a Charging Response 930 to SMF 145-1. SMF 145-1, in turn, returns a Session Establishment Response 935 to UE 105-1. As further shown in FIG. 9A, upon receipt of the Charging Request 920, CCS 165-1 sends an Update Consumption Counter Request 937 to account grouper 170 that includes a consumption update (e.g., indicating an amount of network service units used) for the current session involving UE 105-1. Upon receipt of the Request 937, account grouper 170 updates 940 the CDR stored at account grouper 170 for account y to reflect the additional consumption during UE 105-1's current session. After updating the account CDR, account grouper 170 returns an Update Consumption Counter Response 943 to CCS 165-1.

Blocks 810-830 may be repeated, as shown at 833 in FIG. 8B, for each subscriber$_x$ of n subscribers within a zone x for the Account y, with session establishment, and CDR creation, concluding for a subscriber$_n$ at blocks 835-855. For example, subscriber$_n$ sends a session establishment request to SMF 145-$n$ within zone n 130-$n$ (block 835). The session establishment request, sent from a UE 105, may encounter other nodes (omitted from FIGS. 9A and 9B below for purposes of simplicity) of the mobile network before reaching SMF$_n$ 145-$n$. For example, the UE 105 may send the session establishment request to AMF$_n$ 150-$n$, which, in turn, sends the session establishment request to SMF 145-$n$. SMF 145-$n$, upon receipt of the session establishment request, sends a Charging Create Request to CCS 165-$n$ (block 840), and CCS 165-$n$ opens a CDR for the subscriber's session and returns a Charging Create Response to the SMF 145-$n$ (block 845). Further, CCS 165-$n$ sends an Update Consumption Counter Request to account grouper 170 (block 850) and account grouper 170, upon receipt of the Update Consumption Counter Request, opens a CDR for the account y and returns an Update Consumption Counter Response to the CCS 165-$n$ block 855).

Referring again to FIG. 9A, UE 105-2 is shown sending a session establishment request 945 to SMF 145-2 in Zone$_2$ 130-2 and SMF 145-2, in turn, sending a Charging Request 950 to CCS 165-2. CCS 165-2 opens 955 a CDR, for tracking the subscriber's consumption for the session, and returns a Charging Response 958 to SMF 145-2. SMF 145-2, in turn, returns a Session Establishment Response 960 to UE 105-2. As further shown in FIG. 9A, upon receipt of the Charging Request 950, CCS 165-2 sends an Update Consumption Counter Request 963 to account grouper 170 that includes a consumption update (e.g., indicating an amount of network service units used) for the current session involving UE 105-2. Upon receipt of the Request 963, account grouper 170 updates 965 the CDR stored at account grouper 170 for account y to reflect the additional consumption during UE 105-2's current session. After updating the account CDR, account grouper 170 returns an Update Consumption Counter Response 968 to CCS 165-2.

UE$_n$ 105-$n$ is further shown (FIG. 9B) sending a session establishment request 970 to SMF 145-$n$ in Zone n 130-$n$ and SMF 145-$n$, in turn, sending a Charging Request 973 to CCS 165-$n$. CCS 165-$n$ opens 975 a CDR, for tracking the subscriber's consumption for the session, and returns a Charging Response 977 to SMF 145-$n$. SMF 145-$n$, in turn, returns a Session Establishment Response 980 to UE 105-$n$. As further shown in FIG. 9B, upon receipt of the Charging Request 973, CCS 165-$n$ sends an Update Consumption Counter Request 983 to account grouper 170 that includes a consumption update (e.g., indicating an amount of network service units used) for the current session involving UE 105-$n$. Upon receipt of the Request 983, account grouper 170 updates 985 the CDR stored at account grouper 170 for account y to reflect the additional consumption during UE 105-$n$'s current session. After updating the account CDR, account grouper 170 returns an Update Consumption Counter Response 987 to CCS 165-$n$.

As described herein, the ABMF is deployed as a separate, centralized network component to maintain and track network consumption counters for network service accounts across multiple account subscribers and across multiple different geographic regions within a mobile network. CCS instances, distributed throughout multiple different regions of the mobile network, interface with the centralized ABMF to report consumptions of each subscriber, and the centralized ABMF updates the consumption counter for each account, including multiple subscribers sharing consumption on each shared account, based on the reported consumption.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B, 8A, and 8B, and sequences of operations, messages, and/or data flows with respect to FIGS. 7, 9A, and 9B, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 520) of a device. A non-transitory storage medium includes one or more of the storage mediums described in relation to memory 530. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 sending a first pre-authorization, by an Account Balance Management Function (ABMF) located in a mobile network to a first Converged Charging System (CCS) located in the mobile network, to pre-authorize network service unit consumption by a first subscriber of a plurality of subscribers that are members of a same, shared network service account;

sending a second pre-authorization, by the ABMF to a second CCS located in the mobile network, to pre-authorize network service unit consumption by a second subscriber of the plurality of subscribers, wherein the first CCS and the second CCS are located at physically distributed locations in the mobile network relative to the ABMF;

receiving, by the ABMF from the first CCS, first network unit consumption charges associated with the first subscriber of the plurality of subscribers;

receiving, by the ABMF from the second CCS, second network unit consumption charges associated with the second subscriber of the plurality of subscribers; and updating, by the ABMF, a consumption counter for the same, shared network service account based on the first and second network unit consumption charges, associated with the first and second subscribers, received from the first CCS and the second CCS.

2. The method of claim 1, wherein the mobile network comprises a Next Generation mobile network.

3. The method of claim 1, further comprising:
opening a Charging Data Record (CDR) for the shared network service account,
wherein updating the consumption counter further comprises:
updating a content of the CDR based on the first and second network unit consumption charges.

4. The method of claim 1, further comprising:
returning, after the updating of the consumption counter, update consumption counter responses to the first CCS and the second CCS.

5. The method of claim 1, wherein the ABMF is located at a first physical location, the first CCS is located at a second physical location, and the second CCS is located at a third physical location, and wherein the first, second, and third physical locations are different physical locations within the mobile network.

6. The method of claim 3, wherein the second physical location is located within a first geographic region and the third physical location is located within a second geographic region of a plurality of different geographic regions of the mobile network.

7. The method of claim 5, wherein the ABMF executes at a first data center residing at the first physical location in the mobile network, the first CCS executes at a second data center residing at the second physical location in the mobile network, and the second CCS executes at a third data center residing at the third physical location in the mobile network, and wherein the second data center and the third data center are different than the first data center.

8. A network device, comprising:
at least one communication interface connected to a mobile network; and
at least one processor configured to execute an Account Balance Management Function (ABMF) to:
send a first pre-authorization, via the at least one communication interface to a first Converged Charging System (CCS) located in the mobile network, to pre-authorize network service unit consumption by a first subscriber of a plurality of subscribers that are members of a same, shared network service account;
send a second pre-authorization, via the at least one communication interface to a second CCS located in the mobile network, to pre-authorize network service unit consumption by a second subscriber of the plurality of subscribers, wherein the first CCS and the second CCS are located at physically distributed locations in the mobile network relative to the ABMF;
receive, via the at least one communication interface from the first CCS, first network unit consumption charges associated with the first subscriber of the plurality of subscribers;
receive, via the at least one communication interface from the second CCS, second network unit consumption charges associated with the second subscriber of the plurality of subscribers; and
update a consumption counter for the same, shared network service account based on the first and second network unit consumption charges, associated with the first and second subscribers, received from the first CCS and the second CCS.

9. The network device of claim 8, wherein the mobile network comprises a Next Generation mobile network.

10. The network device of claim 8, wherein the at least one processor is configured to execute the ABMF to:
open a Charging Data Record (CDR) for the shared network service account, and
wherein, when updating the consumption counter, the at least one processor is further configured to execute the ABMF to:
update a content of the CDR based on the first and second network unit consumption charges.

11. The network device of claim 8, wherein the at least one processor is configured to execute the ABMF to:
return, after the updating of the consumption counter, update consumption counter responses to the first CCS and the second CCS.

12. The network device of claim 8, wherein the ABMF is located at a first physical location, the first CCS is located at a second physical location, and the second CCS is located at a third physical location, and wherein the first, second, and third physical locations are different physical locations within the mobile network.

13. The network device of claim 12, wherein the second physical location is located within a first geographic region and the third physical location is located within a second geographic region of a plurality of different geographic regions of the mobile network.

14. The network device of claim 12, wherein the ABMF executes at a first data center residing at the first physical location in the mobile network, the first CCS executes at a second data center residing at the second physical location, and the second CCS executes at a third data center residing at the third physical location in the mobile network, and wherein the second data center and the third data center are different than the first data center.

15. A non-transitory storage medium storing instructions executable by a network device in a mobile network, wherein the instructions comprise instructions to cause the network device to execute an Account Balance Management Function (ABMF) to:
send a first pre-authorization, to a first Converged Charging System (CCS) located in the Next Generation mobile network, to pre-authorize network service unit consumption by a first subscriber of a plurality of subscribers that are members of a same, shared network service account;
send a second pre-authorization, to a second CCS located in the mobile network, to pre-authorize network service unit consumption by a second subscriber of the plurality of subscribers, wherein the first CCS and the second CCS are located at physically distributed locations in the mobile network relative to the ABMF;

receive, from the first CCS, first network unit consumption charges associated with the first subscriber of the plurality of subscribers;

receive, from the second CCS, second network unit consumption charges associated with the second subscriber of the plurality of subscribers; and update a consumption counter for the same, shared network service account based on the first and second network unit consumption charges, associated with the first and second subscribers, received from the first CCS and the second CCS.

16. The non-transitory storage medium of claim 15, wherein the mobile network comprises a Next Generation mobile network.

17. The non-transitory storage medium of claim 15, wherein the instructions comprise instructions to cause the network device to execute the ABMF to:

open a Charging Data Record (CDR) for the shared network service account, and wherein, when updating the consumption counter, the instructions cause the network device to execute the ABMF to:

update a content of the CDR based on the first and second network unit consumption charges.

18. The non-transitory storage medium of claim 15, wherein the instructions comprise instructions to cause the network device to execute the ABMF to:

return, after the updating of the consumption counter, update consumption counter responses to the first CCS and the second CCS.

19. The non-transitory storage medium of claim 15, wherein the ABMF is located at a first physical location, the first CCS is located at a second physical location, and the second CCS is located at a third physical location, and wherein the first, second, and third physical locations are different physical locations within the mobile network.

20. The non-transitory storage medium of claim 19, wherein the second physical location is located within a first geographic region and the third physical location is located within a second geographic region of a plurality of different geographic regions of the mobile network.

21. The non-transitory storage medium of claim 19, wherein the network device comprises a first data center residing at the first physical location in the mobile network, the first CCS executes at a second data center residing at the second physical location in the mobile network, and the second CCS executes at a third data center residing at the third physical location in the mobile network, and wherein the second data center and the third data center are different than the first data center.

\* \* \* \* \*